Figure 1:
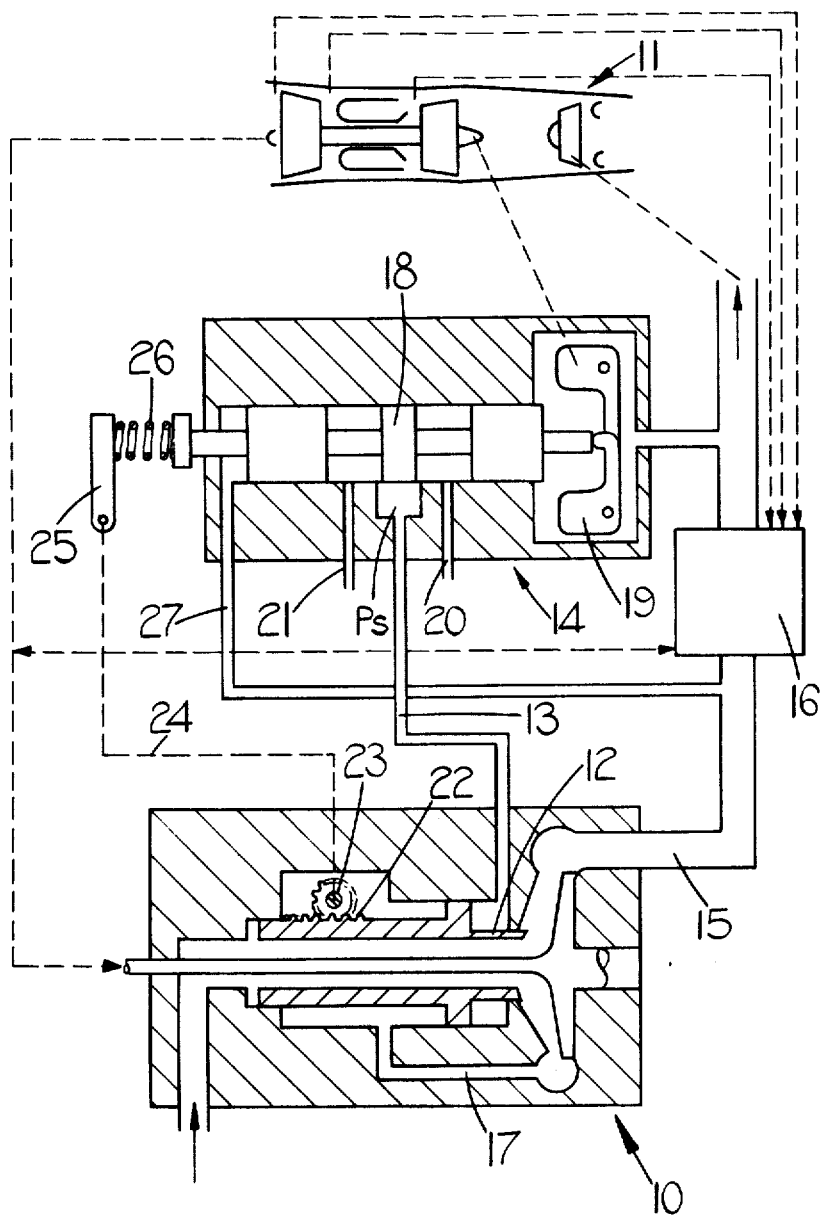

United States Patent [19]
Lewis

[11] 3,913,317
[45] Oct. 21, 1975

[54] FUEL CONTROL APPARATUS FOR GAS TURBINE ENGINES

[75] Inventor: Geoffrey Arthur Lewis, Solihull, England

[73] Assignee: Joseph Lucas (Industries) Limited, Birmingham, England

[22] Filed: Dec. 6, 1973

[21] Appl. No.: 422,161

[30] Foreign Application Priority Data
Jan. 26, 1973  United Kingdom............... 3983/73

[52] U.S. Cl............................. 60/39.28 R; 60/243
[51] Int. Cl.............................................. F02c 9/08
[58] Field of Search...................... 60/39.28 R, 243

[56] References Cited
UNITED STATES PATENTS

| | | | |
|---|---|---|---|
| 2,911,033 | 11/1959 | Eley | 60/39.28 R |
| 3,128,822 | 4/1964 | Tyler | 60/39.28 R |
| 3,301,309 | 1/1967 | Tyler | 60/39.28 R |
| 3,316,712 | 5/1967 | Tyler | 60/39.28 R |
| 3,601,990 | 8/1971 | Johnson | 60/39.28 R |

*Primary Examiner*—Clarence R. Gordon
*Attorney, Agent, or Firm*—Holman & Stern

[57] ABSTRACT

A fuel control apparatus has a pump which includes a throttle valve and which delivers fuel to an associated engine via a variable metering device. A control valve arrangement is responsive to the fuel pressure drop across the metering device to provide a servo pressure signal which controls the setting of the pump throttle valve. A position feedback arrangement is responsive to the throttle valve setting to modify the position of the control valve arrangement, and hence the servo pressure signal.

12 Claims, 8 Drawing Figures

FUEL CONTROL APPARATUS FOR GAS TURBINE ENGINES

This invention relates to fuel control apparatus for gas turbine engines, and in particular to control arrangements for gas turbine engine reheat systems.

It is known to provide fuel control apparatus in which a pump having a throttle supplies fuel via a variable metering device to burners in the engine. The throttle is operable by a servo-pressure signal which is responsive to a fuel pressure drop across the variable metering device. A feedback signal relating to the throttle position is derived from the pump output pressure and is used to modify the servo pressure signal.

Such apparatus has, in some cases, been found unsatisfactory in that the time taken, after movement of the throttle, for the pump output pressure to reach a level corresponding to the new throttle position, results in unacceptably long response times for the control loop which includes the throttle and a means for generating the servo pressure signal.

It is an object of the invention to provide a fuel control apparatus of the foregoing type in which the servo pressure signal is modified substantially immediately in response to the changes in the throttle position.

According to the invention a fuel control apparatus for a gas turbine engine comprises a pump, a variable metering device responsive to engine operating conditions and through which, in use, fuel flows to the engine, a servo pressure control arrangement including a valve movable in response to a decrease in a pressure drop across the variable metering device to provide an increase in a servo pressure signal, a throttle for said pump, said throttle being movable in response to an increase in said servo pressure signal to increase the delivery pressure of said pump, and means responsive to the position of said throttle and operatively connected to said valve so that movement of said throttle in a direction to increase said delivery pressure urges said valve to decrease said servo pressure signal.

Figure 2:
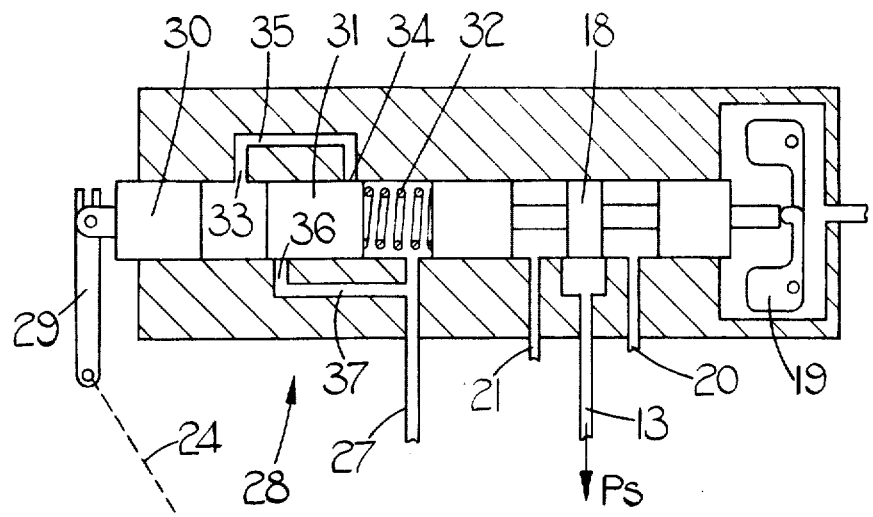
Figure 3:
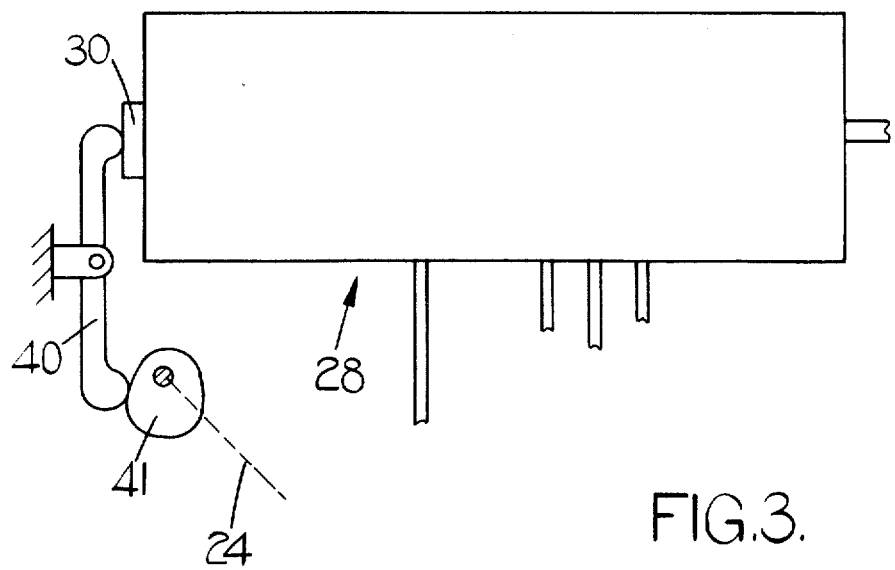
Figure 4:
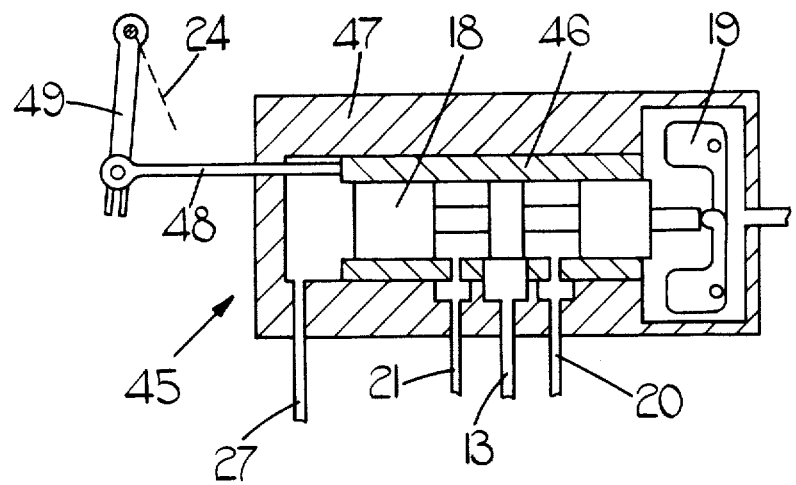
Figure 5:
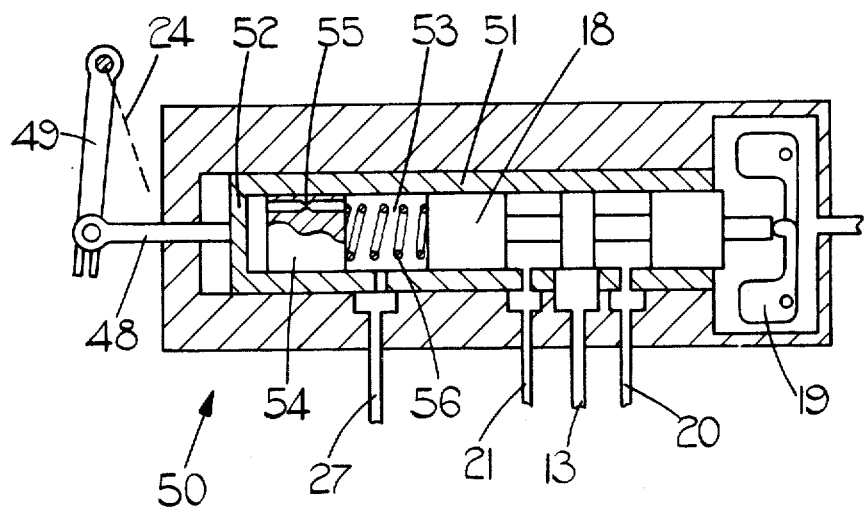
Figure 6:
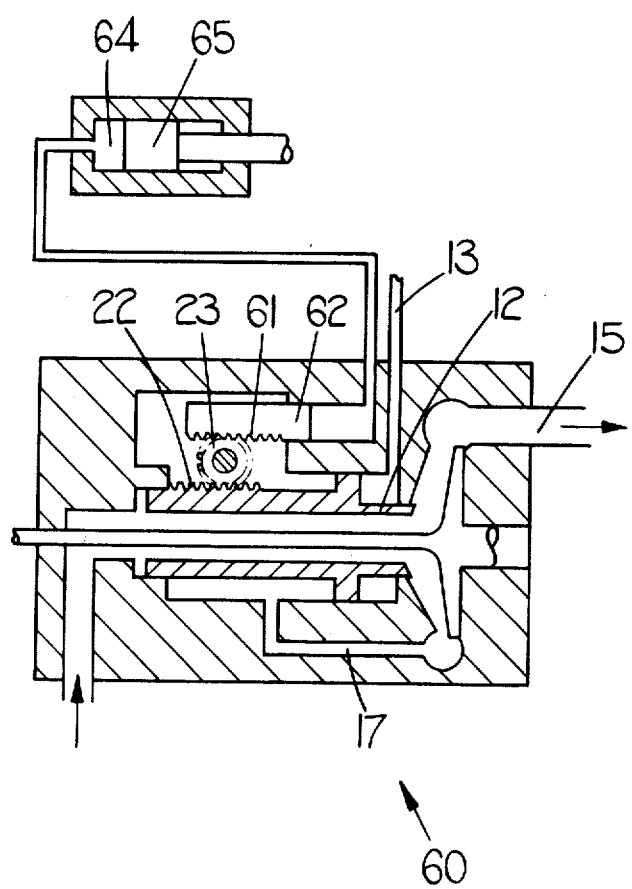
Figure 7:
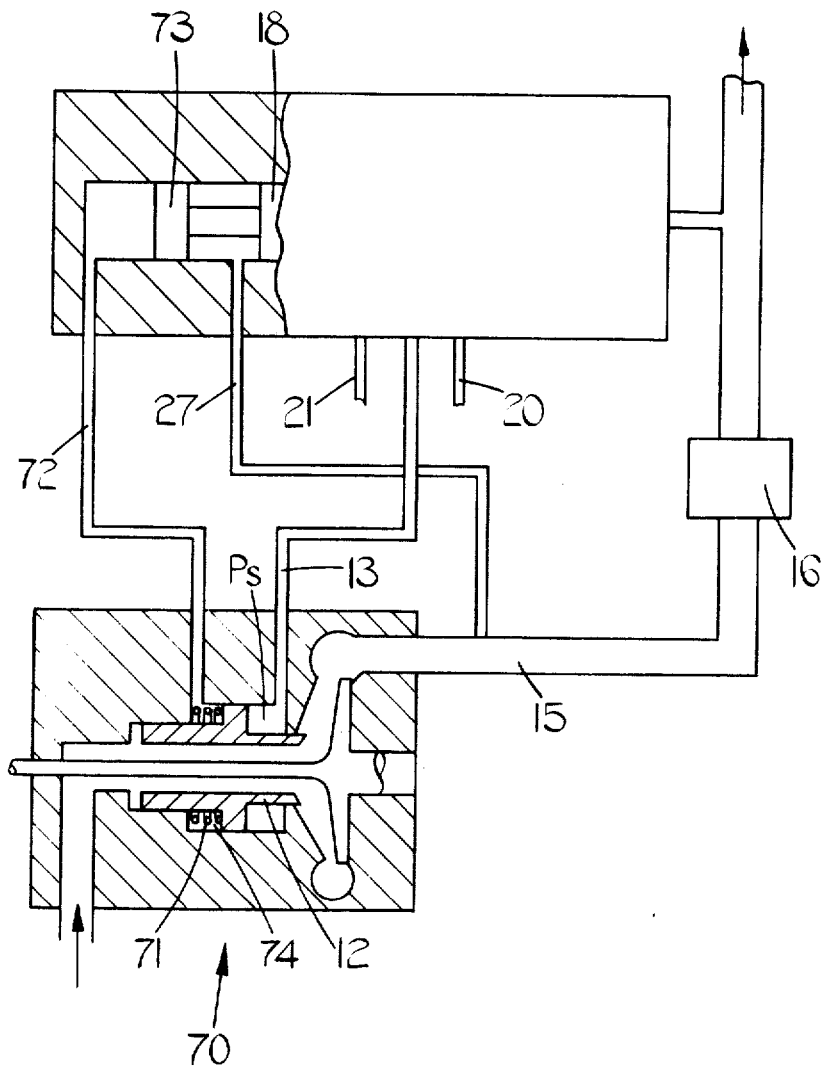
Figure 8:
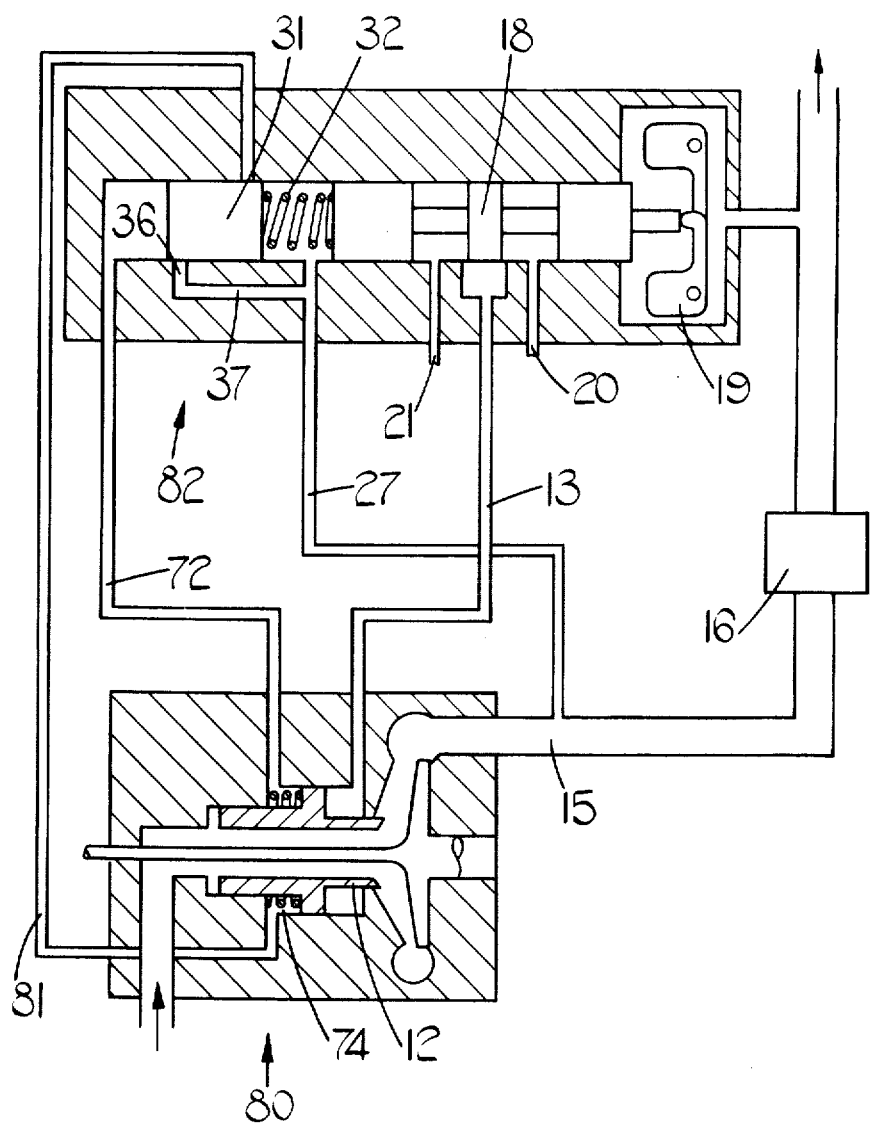

Examples of the invention will now be described with reference to the accompanying drawings, in which:

FIG. 1 is a diagram of a fuel control arrangement,

FIG. 2 shows a modified form of the servo pressure control arrangement forming part of FIG. 1, FIG. 3 shows a modification of the position-responsive means associated with FIG. 2, FIGS. 4 and 5 show further alternative forms of the servo pressure control arrangement forming part of FIG. 1, FIG. 6 shows a modification of the position-responsive means forming part of FIG. 1, FIG. 7 shows an alternative form of fuel control apparatus, and FIG. 8 shows a modification of the apparatus of FIG. 7.

The fuel control arrangement shown in FIG. 1 has a centrifugal vapour-core pump 10 driven by a shaft of a gas turbine engine 11. Pump 10 includes a throttle sleeve 12 which is responsive to a servo pressure signal $P_s$ 6n a line 13 to increase pump delivery. The signal $P_s$ is derived from a control arrangement 14, later to be described.

Throttle 12 is biased against pressure $P_s$ by the pump outlet pressure, applied via a passage 17. The outlet 15 of pump 10 is connected via a variable metering device 16 to the reheat burners of the engine 11. Device 16 is substantially the same as that shown and described in our U.S. patent application Ser. No. 348,635. Device 16, in fact, includes separate control elements for regulating fuel flow to three separate burners of the reheat system, only one of the flow lines being shown in FIG. 1 of the specification.

Control arrangement 14 includes a valve spool 18 slidable within a bore and urged in one direction by the delivery pressure from pump 10, supplied via a line 27 and in the opposite direction by the pressure downstream of the metering device 16 and by a governor mechanism 19 responsive to the speed of the engine 11. A passage 20 connects the bore of arrangement 14 with a high pressure source, conveniently the outlet of a main fuel pump for the engine. A further passage 21 connects the bore to a low pressure drain. In the mid-position of spool 18 shown in the drawing, pressure $P_s$ in line 13 is intermediate the pressure in passages 20, 21.

Throttle 12 includes a portion having rack teeth 22 which engage a pinion 23. Pinion 23 is secured to a shaft 24 on which a lever 25 is fixedly mounted. Lever 25 engages a spring 26 which acts on an end of valve spool 18 remote from governor arrangement 19, the arrangement being that movement of throttle 12 to the right to decrease fuel flow from pump 10 causes lever 25 to compress spring 26.

In use, therefore, pump 10 is driven by the engine to supply fuel to device 16 which, in turn, delivers fuel to the reheat burners in accordance with operating conditions of the engine. If device 16 acts to reduce fuel flow, the pressure difference across the device 16 increases, and spool 18 moves to the right, causing pressure $P_s$ to fall. Throttle 12 thus moves to reduce the delivery of pump 10.

This movement of throttle 12 is transmitted via pinion 23 and shaft 24 to move lever 25 counter-clockwise, as seen in FIG. 1, to reduce the force applied by spring 26 to spool 18. Spool 18 thus starts to move leftwards, increasing pressure $P_s$ and reducing the nett force urging throttle 12 to the right. The subsequent reduction in pump delivery pressure is applied via passage 17 to throttle 12 and also causes additional movement of spool 18 to the left. Throttle 12 thus takes up a new equilibrium position in which the force due to pump delivery pressure is balanced by the force due to the new value of servo pressure $P_s$. The dimensions of the respective areas of throttle 12, on which the pressure $P_s$ and the pump delivery pressure act are such that the pump delivery is altered so as to cause the pressure drop across device 16 to tend towards a constant value.

It will be understood that a reduction in pressure drop across device 16 similarly acts to increase pump delivery so as to return this pressure drop to its original level.

The modified servo control arrangement 28 shown in FIG. 2 is generally similar to arrangement 14 of FIG. 1, similar components having identical reference numerals. Shaft 24, however, is coupled by a crank 29 to a piston 30 which is slidable in the bore of arrangement 28. A slave piston 31 is also slidable in the bore and a torsionally-stiff spring 32 is secured to the adjacent ends of piston 31 and spool 18.

Ports 33, 34 open into the bore and are interconnected by a passage 35. A further port 36 is connected to passage 27 by a passage 37. The positions of ports 33, 34 and 36, and the length of piston 31, are such that movement of piston 31 by a substantial amount in either direction from the position shown in the drawing will cause piston 31 to be bypassed. The force which can be applied to spool 18 by spring 32 is thereby limited. Since ports 34, 36 can combine with associated edges of piston 31 to provide flow restrictors, the amount of movement of piston 31, before the pressures thereon are equalised, is dependent on the rate of movement of piston 31. This rate of movement is, in turn, dependent on the rate of movement of pump throttle 12. The modification shown in FIG. 2 thus provides a velocity term in the feedback signal from throttle 12.

The modification shown in FIG. 3 includes a servo control arrangement 28, as shown in FIG. 2. Piston 30, is however, engaged by a first-order lever 40 which is mounted on a relatively fixed pivot and whose other end engages a cam 41 rotatable by shaft 24. Movement of piston 30 in response to movement of pump throttle 12 can thus be set to a required characteristic, by replacement of the cam or by rotation of the cam relative to the shaft 24.

The servo pressure control arrangement 45, shown in FIG. 4, is generally similar to the arrangement 14 of FIG. 1, identical parts having the same reference numerals. Spool 18 is in this case, however, slidable in a sleeve 46 which is itself slidable within a housing 47 6f the arrangement 45. Passages 13, 20, 21 communicate with the bore of sleeve 46 via respective ports in the sleeve 46 in such a way that this communication is not affected by the relative positions of sleeve 46 and housing 47.

Sleeve 46, is secured to a rod 48 which extends sealingly through an end wall of the housing 47 and pivotally engages a crank 49 secured to the shaft 24.

The arrangement is such that movement of the pump throttle 12 to reduce pump delivery moves sleeve 46 to the left. The effect of this movement is the same as if spool 18 had been urged to the right by the same movement of throttle 12.

FIG. 5 shows a servo pressure control arrangement 50 which is a modification of that shown in FIG. 4. Arrangement 50 has a sleeve 51 having a closed end 52 so that a closed chamber 53 is defined within the bore of sleeve 51 between end 52 and the adjacent end of spool 18. Slidable within chamber 53 is a free piston 54 having a restricted passage 55 extending therethrough. A torsionally-stiff spring 56 is secured to the adjacent ends of piston 54 and spool 18.

In use, movement of sleeve 51 in either direction initially urges piston 54, and hence spool 18 in the same direction. The force urging spool 18 to follow sleeve 51 decreases as a result of flow through restricted passage 55. The rate at which this force decreases will be dependent on the rate of movement of piston 54, and hence on the rate of movement of pump throttle 12. A damping effect is thus introduced into the response of arrangement 50, and this damping effect is responsive to the velocity of throttle 12.

The throttle position responsive arrangement shown in FIG. 6 incorporates a pump 60 which is generally similar to the pump 10. In this case, however, pinion 23 engages a rack portion 61 of a further piston 62 slidable in a cylinder 63. Cylinder 63 communicates with a further cylinder 64 in which a slave piston 65 is slidable. The stem of piston 65 provides an output member whose movement corresponds to movement of throttle 12, the ratio of the respective movements being dependent on the dimensions of the pistons 62, 65. It will be appreciated that this position-responsive arrangement can be used in conjunction with any of the embodiments described with reference to FIGS. 1 to 5, instead of the mechanical linkages shown therein.

The fuel control apparatus shown in FIG. 7 has a pump 70 which differs from the pump 10 of FIG. 1 in that throttle 12 is biased against the servo pressure $Ps$ in line 13 by a spring 71 within a chamber 74. Throttle 12, moreover, has no rack portion and associated pinion. Movement of throttle 12 is transmitted hydraulically via a passage 72 from chamber 74 to a slave piston 73 connected to the valve spool 18 of a servo pressure control arrangement 74 which differs from arrangement 14 of FIG. 1 only by inclusion of the piston 73. This arrangement thus provides a position feed-back signal by an alternative means to that shown in FIG. 6.

The fuel control apparatus shown in FIG. 8 has a pump 80 which is generally similar to the pump 70 of FIG. 7. An additional passage 81, however, also communicates with the chamber 74 in pump 80.

A servo pressure control arrangement 82 is generally similar to the arrangement 28 of FIG. 2, except that the slave piston 31 is responsive to movement of throttle 12, transmitted via passage 72. Passage 81 communicates with the bore of arrangement 82 so that movement of piston 31 to the left (as seen in the drawing) beyond a predetermined distance, causes piston 31 to be bypassed via the chamber 74 of pump 80. Fuel is then drawn into chamber 74 from pump outlet 15, via passages 27, 81. Subsequent movement of piston 31 to the right so as to uncover port 36 permits fuel to flow from chamber 74, via passages 72, 37, 27 to pump outlet 15. Oscillation of throttle 12 thus causes a flow of fuel through chamber 74 and through the chamber defined between piston 31 and an end wall of the bore of arrangement 82. This action serves to remove air or vapour from this part of the hydraulic circuit.

I claim:

1. A fuel control apparatus for a gas turbine engine, comprising a pump having an inlet and an outlet, a variable metering device responsive to engine operating conditions and through which, in use, fuel flows to the engine, a servo pressure control arrangement including a valve movable in response to a decrease in a pressure drop across the variable metering device to provide an increase in a servo pressure signal, a throttle for said pump between the inlet and outlet thereof, said throttle being movable in response to an increase in said servo pressure signal to increase the delivery pressure of said pump, and means responsive to the position of said pump throttle and operatively connected to said valve so that movement of said pump throttle in a direction to increase said delivery pressure urges said valve to decrease said servo pressure signal.

2. A fuel control apparatus for a gas turbine engine, comprising a pump having an inlet and an outlet, a variable metering device responsive to engine operating conditions and through which, in use, fuel flows to the engine, a servo pressure control arrangement including a valve movable in response to a decrease in a pressure drop across the variable metering device to provide an increase in a servo pressure signal, a throttle between said pump between the inlet and outlet thereof, said throttle being movable in response to an increase in said servo pressure signal to increase the delivery pressure of said pump, a shaft rotatable by movement of said throttle, and a lever pivotally movable by said shaft, said lever coacting with said valve so that movement of said pump throttle in a direction to increase said delivery pressure urges said valve to decrease said servo pressure signal.

3. An apparatus as claimed in claim 2 in which said throttle includes a gear-toothed portion and said throttle-position responsive means includes a toothed gear element engaging said toothed portion and drivingly connected to said shaft.

4. An apparatus as claimed in claim 2 which includes a cam mounted on said shaft for rotation thereby, one end of said lever engaging said cam and the other end of said lever coacting with said valve.

5. An apparatus as claimed in claim 1 which includes a spring engaged between said throttle-position responsive means and said valve, said spring biasing said valve against movement due to a decrease in said pressure drop, said throttle-position responsive means being operable to vary the bias applied by said spring.

6. An apparatus as claim in claim 5 in which said throttle-position responsive means includes means for generating a further servo pressure signal dependent on the position of said throttle, and a first piston responsive to said further servo pressure signal, said spring being engaged between said first piston and said valve.

7. An apparatus as claim in claim 6 in which said means for generating the further servo pressure signal comprises a second piston movable by said throttle, said further servo pressure signal being generated in a space defined between said first and second pistons.

8. An apparatus as claimed in claim 7 which includes means for limiting movement of said first piston in a first direction to decrease the first-mentioned servo pressure signal.

9. An apparatus as claimed in claim 8 in which said limiting means comprises a passage which is opened by movement, beyond a predetermined limit, of said first piston in said first direction to equalise the pressures on opposite sides of said first piston.

10. An apparatus as claimed in claim 7 which includes further means for limiting movement of said first piston in a second direction to increase the first-mentioned servo pressure.

11. An apparatus as claimed in claim 10 in which said further limiting means comprises a passage which is opened by movement, beyond a predetermined limit, of said first piston in said second direction, to equalise the pressures on opposite sides of said first piston.

12. An apparatus as claimed in claim 1 in which said valve includes a spool movable in response to said servo pressure signal and ported sleeve surrounding said spool, said sleeve being coupled to said throttle-position responsive means for movement thereby.

* * * * *